United States Patent [19]
Watanabe et al.

[11] 3,893,875
[45] July 8, 1975

[54] METHOD OF MAKING A LUMINESCENT DIODE

[75] Inventors: Naozo Watanabe, Tokyo; Kunio Kaneko; Masasi Dosen, both of Yokohama, all of Japan

[73] Assignee: Sony Corporation, Tokyo, Japan

[22] Filed: Mar. 21, 1972

[21] Appl. No.: 236,695

Related U.S. Application Data

[63] Continuation-in-part of Ser. No. 27,794, April 13, 1970, Pat. No. 3,689,330.

[30] Foreign Application Priority Data

Apr. 18, 1969 Japan ............................... 44-30117

[52] U.S. Cl. ................ 148/172; 148/171; 148/189; 252/62.3 GA

[51] Int. Cl. ............................................... H01l 7/38

[58] Field of Search .................... 148/171, 189, 172; 252/62.3 GA

[56] References Cited

UNITED STATES PATENTS

| | | | |
|---|---|---|---|
| 3,496,429 | 2/1970 | Robinson | 148/189 X |
| 3,549,401 | 12/1970 | Buszko et al. | 148/1.6 X |
| 3,585,087 | 6/1971 | Blum et al. | 148/171 |
| 3,592,704 | 7/1971 | Logan et al. | 148/171 |
| 3,603,833 | 9/1971 | Logan et al. | 148/171 X |
| 3,647,579 | 3/1972 | Ladany | 148/171 |
| 3,689,330 | 9/1972 | Dosen et al. | 148/171 |

*Primary Examiner*—G. T. Ozaki
*Attorney, Agent, or Firm*—Hill, Gross, Simpson, Van Santen, Steadman, Chiara & Simpson

[57] ABSTRACT

A method of making a luminescent diode comprising providing gallium phosphide substrate having an impurity donor which can be sulfur or tellurium with a melt of gallium-gallium phosphide solution, heating the substrate and said melt to a temperature range to render the melt in solution, and passing a carrier gas of hydrogen containing hydrogen sulfide and ammonia over the melt and substrate so as to grow an epitaxial layer on the substrate from the melt. The method further includes producing a zinc vapor which is supplied over the substrate as the epitaxial layer is grown, so as to produce luminescent diodes having a very high light emitting efficiency.

3 Claims, 10 Drawing Figures

METHOD OF MAKING A LUMINESCENT DIODE

CROSS-REFERENCE TO RELATED APPLICATION

This application is a continuation-in-part of my co-pending application for "Method of Making a Luminescent Diode", Ser. No. 27,794, filed Apr. 13, 1970, now U.S. Pat. No. 3,689,330, and assigned to the same assignee as the present invention.

BACKGROUND OF THE INVENTION

Conventional methods of forming a luminescent diode comprises the steps of providing a substrate which contains an n-type material such as tellurium and providing a melt containing a p-type material such as zinc. Both the melt and the substrate are gallium phosphide. The melt also contains gallium and gallium trioxide. When the melt is caused to overlie the substrate, a pn junction is formed on cooling.

It is known that the red emission of a gallium phosphide diode is caused by radiative transition between zinc and oxygen. However, due to the much higher diffusion rate of zinc than the dopant, insufficient quantities of dopant have become doped into the pn junction making it impossible to produce an efficient luminescent diode of the type described.

FIELD OF THE INVENTION

This invention relates to a luminescent diode and to a method of making the same.

SUMMARY OF THE INVENTION

The present invention is a novel luminescent diode and a novel method for making the same.

Another objective of the present invention is to provide a luminescent diode for emitting green light and to a method of making the same.

Still another objective of the present invention is to provide a novel luminescent diode for producing red light and to a method of making the same.

A further objective of the present invention is to provide a red luminescent diode of high efficiency in which a junction is provided within an epitaxial growth layer which includes oxygen therein as a dopant.

Still another objective of the present invention is to provide a green luminescent diode of high efficiency in which a junction is provided within an epitaxial growth layer which includes nitrogen.

A still further objective of the present invention is to provide a novel method for improving the doping of nitrogen or oxygen into the pn junction of a luminescent diode.

It is also an object of the present invention to provide a method for forming a diode from a gallium phosphide substrate and a gallium phosphide melt which is highly efficient as a luminescent diode.

It is still another object of the present invention to provide a method for forming a luminescent diode including the step of using a carrier gas to dope oxygen or nitrogen into a gallium phosphide melt.

It is a further object of the present invention to provide a method for forming a gallium phosphide luminescent diode including the step of doping oxygen or nitrogen into a gallium phosphide melt prior to the forming of an epitaxial growth on a substrate.

It is also an object of the present invention to provide a gallium phosphide luminescent diode as described above wherein one of the two impurities in the material is introduced as a vapor after the doping of oxygen or nitrogen into the gallium phosphide melt and during the formation of the epitaxial growth at the surface of the substrate.

It is yet another object of the present invention to provide a gallium phosphide luminescent diode as described above wherein the oxygen which is doped into the gallium phosphide melt is produced by the heating of gallium and gallium trioxide in the presence of the carrier gas nitrogen.

These and other objects, features and advantages of the invention will be readily apparent from the following description of preferred embodiments thereof, taken in conjunction with the accompanying drawings, although variations and modifications may be effected without departing from the spirit and scope of the novel concepts of the disclosure.

BRIEF DESCRIPTION OF THE DRAWINGS

FIG. 7 illustrates several graphs plotted for different temperatures of the furnace.

DESCRIPTION OF THE PREFERRED EMBODIMENTS

One preferred form of the present invention is a luminescent diode and a method of forming the same. The diode is a gallium phosphide diode. In the past, it has been difficult to increase the efficiency of such diodes due to the difficulty of doping oxygen into the pn junction. By the present invention, however, oxygen is doped into the melt prior to the forming of the diode with the assistance of a carrier gas. The entire operation is accomplished in an open tube for the tractability of the apparatus.

In the prior art systems, the oxygen and the p-type impurity were attempted to be doped in the epitaxial layer to form the pn junction at the interface. However, due to the increased diffusion rate of the p-type impurity in comparison to the diffusion rate of the oxygen, insufficient oxygen became doped into the pn junction resulting in the inefficiency of the luminescent diode.

In the method according to the first form of the present invention, oxygen is doped directly into the melt and the p-type impurity is later added to form the junction during the formation of the epitaxial layer between the substrate and the melt.

A single crystal of gallium phosphide is easily obtained commercially, and since a gallium phosphide luminescent diode emits a visible light effectively, gallium phosphide has been recently used as a substrate for luminescent diodes. The emission of the red light of a gallium phosphide diode is caused by radiative transition between zinc and oxygen. To improve the luminescence efficiency of the diode, it is necessary to form pairs of these impurities in the vicinity of the pn junction.

The pn junction of a gallium phosphide luminescent diode is generally formed by a liquid phase epitaxial growth. The prior art method of making such a pn junction is illustrated in FIGS. 1, 2 and 3.

Figure 1:
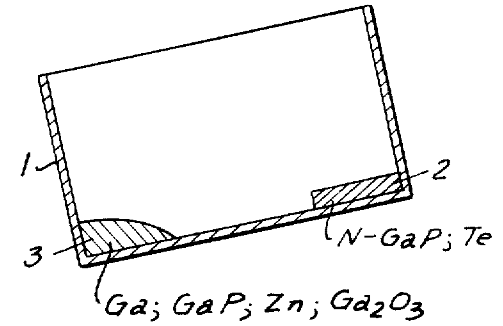
FIG. 1 (PRIOR ART)
FIG. 1 is an illustration of a boat which is used in a first step of a prior art method of forming a luminescent diode.

In FIG. 1, a boat 1 is shown inclined to the left and having a substrate 2 of gallium phosphide containing a tellurium as n-type impurity. The boat 1 also contains a melt of gallium, gallium-phosphide, zinc, and gallium trioxide.

The boat 1 is generally formed of carbon and placed in a furnace (not shown). The boat is heated to a temperature of approximately 1100°C.

Figure 2:
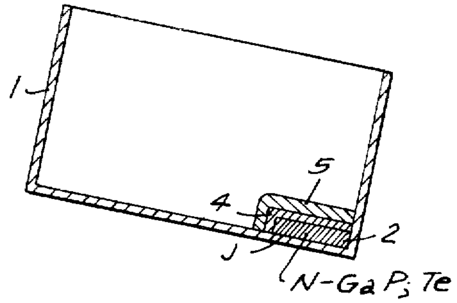
FIG. 2 (PRIOR ART)
FIG. 2 is an illustration of the boat of FIG. 1 with a different inclination to further illustrate the prior art method of forming a luminescent diode.
Figure 3:
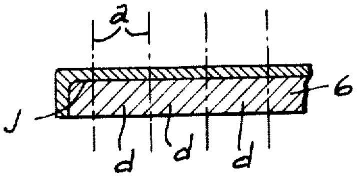
FIG. 3 (PRIOR ART)
FIG. 3 illustrates the appearance of a luminescent diode formed according to the techniques of FIGS. 1 and 2, and showing the points at which the diode is cut to form smaller diode elements.

FIG. 2 shows the boat 1 inclined to the right and cooling. The melt 3 has formed a layer 5 over the substrate 2. An epitaxial layer 4 is gradually formed on the substrate 2 by liquid epitaxial growth from the melt 3. Simultaneously, a pn junction J is formed in the substrate 2 by diffusion of zinc during the liquid epitaxial growth. The region 5 indicates the excess of the melt 3 which is normally a liquid at room temperature and which may be readily removed from the surface of the diode. This excess is a mixture of liquid gallium, gallium phosphide precipitates and small amounts of other impurities.

The completed diode is shown in FIG. 3 with the excess of the melt wiped away. The diode takes the form of a pellet 6 which may then be cut at the dotted lines a into many pieces of diodes having widths *d*.

Since the diffusion coefficient of zinc is much greater than that of oxygen, sufficient oxygen is not doped in the vicinity of the pn junction J of the diode produced by the prior art methods shown in FIGS. 1, 2 and 3. Accordingly, a high efficient luminescent diode cannot be made by the conventional prior art methods.

In the above described prior art method, if the epitaxial process is obtained in an open tube, zinc and oxygen contained in the melt 3 tends to disperse and to be wasted rather than doped efficiently near the junction. Even if the epitaxial process is obtained in a sealed tube, oxygen is not doped into the vicinity of the pn junction J because of the much higher diffusion rate of the zinc.

Since the vapor pressure of gallium monoxide is higher than that of gallium trioxide, gallium trioxide which is contained in the melt is reduced to gallium monoxide to make oxide available as a vapor phase. The vapor pressure of gallium monoxide is 0.4 of atmospheric pressure at 1150°C which is much higher than gallium and gallium phosphide.

In the present invention, doping of oxygen is accomplished by a flow-controlled carrier gas which includes a vapor of gallium monoxide. The carrier gas in the present embodiment is nitrogen. By this technique, oxygen can be doped more readily into the vicinity of the pn junction.

Figure 4:
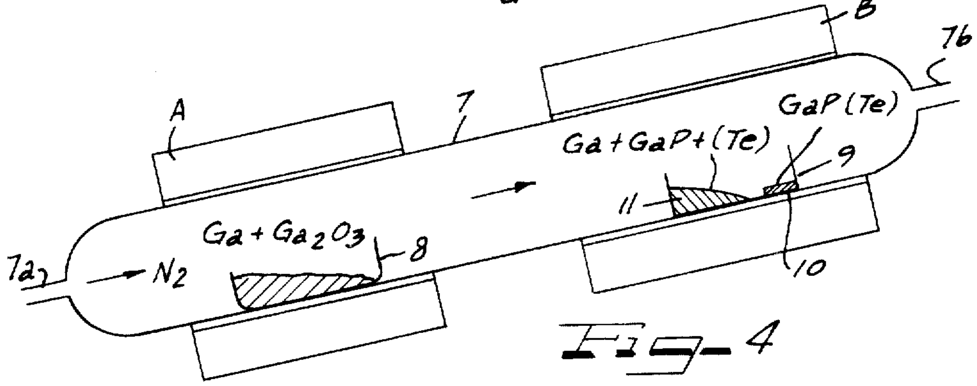
FIG. 4 shows a device for forming a luminescent diode according to the present invention and illustrates the positioning of a pair of boats within a fused quartz tube to accomplish the desired result.
Figure 5:
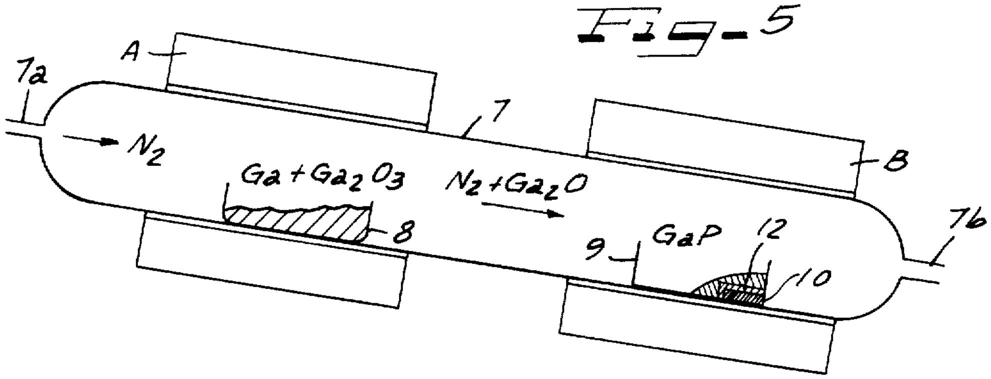
FIG. 5 illustrates the tube of FIG. 4 when inclined in such a way as to cause the melt to overlie the substrate and develop an epitaxial growth for forming a pn junction.

The present invention can be understood in connection with FIGS. 4 and 5. In FIG. 4, an open tube of quartz is indicated generally by the reference numeral 7. The tube 7 has an inlet 7*a* for an inert carrier gas such as nitrogen, argon or a mixture thereof. The tube 7 also has an outlet 7*b*.

Boats 8 and 9 are provided within the tube 7. The boat 9 contains a melt 11 and a substrate 10. The melt 11 contains gallium, gallium phosphide and tellurium, while the substrate 10 contains gallium phosphide with the donor impurity tellurium therein.

A pair of furnaces A and B are provided to heat the respective boats 8 and 9 to the required temperatures. For instance, the furnace A may heat the boat 8 to approximately 1050° to 1350°C, while the furnace B may heat the boat 9 to between 1050° and 1200°C.

When the boat 8 is heated, gallium monoxide gas is produced and flows to the boat 9 in combination with a carrier gas, namely nitrogen. The nitrogen is supplied from the inlet 7*a* toward the outlet 7*b* to carry the gallium monoxide across the melt 11 to allow oxygen to be diffused thereinto.

After sufficient oxygen is diffused into the melt, the boat 9 is inclined to the right as shown in FIG. 5 so that the melt overlies the substrate, and then the furnace B is stopped in such a manner that the melt 11 cools slowly to produce an epitaxial growth layer 12 containing oxygen and tellurium as impurities.

Figure 6:
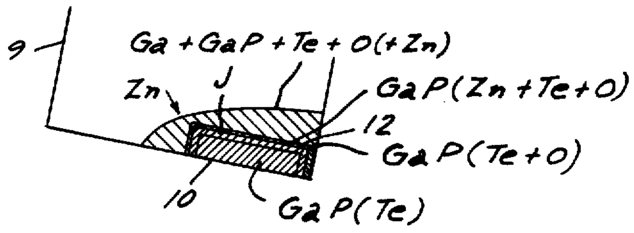
FIG. 6 is an enlarged view of one of the boats which is used in the tube of FIG. 5 and illustrating the position of the junction in the epitaxial layer.

Following the above-described process, the resultant material is subjected to diffusion of zinc by a carrier gas with zinc vapor to form a pn junction J in the epitaxial growth layer as further illustrated in the enlarged drawing of FIG. 6. The diode produced by the above-described process has a high luminescence efficiency for red emitting light.

As an alternate procedure, the zinc may be added to the melt prior to cooling and the epitaxial growth either by reacting zinc gas with the melt or supplying zinc powder into the melt.

The weight loss of oxide is related to the rate of flow of the carrier gas and the temperature of the boat as follows:

$$\frac{W/V}{(W/V)_o} = 1-e^{-\frac{\alpha}{V}}$$

$$\alpha = \frac{AD}{\delta}$$

In the above formula, *W* is the weight loss of gallium monoxide and *V* is the rate of flow of the carrier gas with gallium monoxide vapor *W/V* in parentheses with a small *o* at the lower right is the density of the gas loss when the flow is zero. *A* is the surface area of the melt (approximately 2.8 centimeters squared). *D* is a diffusion constant of gallium monoxide. δ is the thickness of the diffusion layer.

If a tube of 24 millimeters in diameter is used, data relating to the temperature is given by the following table.

| | $\left(\frac{W}{V}\right)_0$ | | $W \alpha V$ region | | $D/\delta$ | |
|---|---|---|---|---|---|---|
| 1150°C | 0.57 | mg/cc | max. 4 | cc/min | 11 | cm/sec |
| 1100°C | 0.26 | " | max. 8 | " | 16 | " |
| 1050°C | 0.11 | " | max. 10 | " | 17 | " |
| 1000°C | 0.041 | " | max. 12 | " | 25 | " |

The vapor pressure of gallium monixide is given as follows:

| Boat Temperature | Atmospheric Pressure |
|---|---|
| 1150°C | $4.3 \times 10^{-1}$ |
| 1100°C | $1.9 \times 10^{-1}$ |
| 1050°C | $7.9 \times 10^{-2}$ |
| 1000°C | $2.8 \times 10^{-2}$ |

Figure 7:
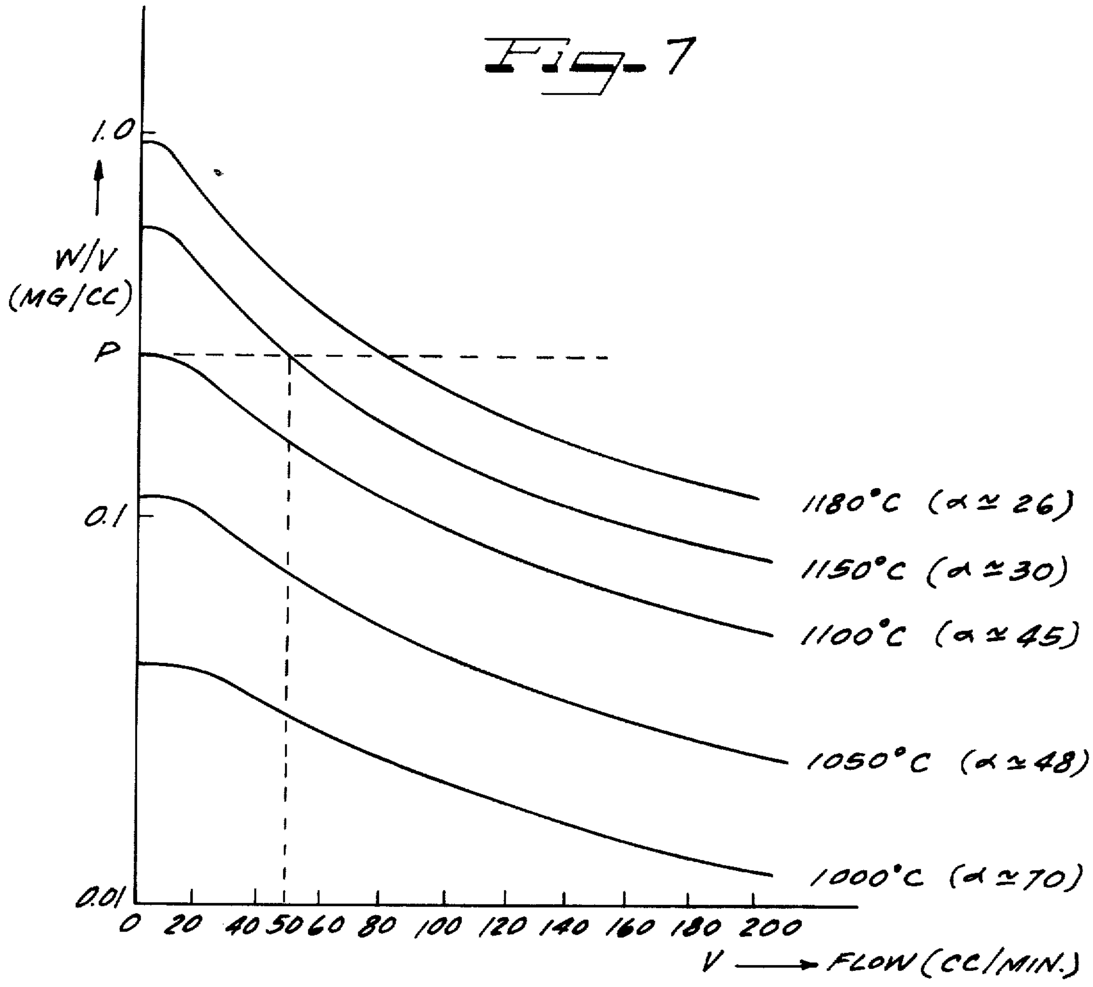
FIG. 7 is a chart showing the weight loss per unit of volume of the carrier gas when plotted against the flow rate of the gas in cubic centimeters per minute.

FIG. 7 shows relationships which have been obtained from the above equations and the above tables for various selected values of temperature.

Referring further to FIG. 7, the point P thereon shows a saturation point for the doping of oxygen at 1100°C with a zero rate of flow of carrier gas. The equivalent oxygen doping may be obtained if the temperature of the boat 8 is 1150° and a flow of carrier gas is selected at 50 cubic centimeters per minute as shown by the intersections of the dotted lines in FIG. 7. Accordingly, by following the chart, the amount of oxygen doping can be controlled by changing the temperature of the boat 8 and the rate of flow of the carrier gas.

According to the present invention, diodes having luminescence efficiencies as high as 2.7 percent have been obtained, an average value being 0.7 percent.

In addition to the above steps, gallium trioxide can also be added directly to the melt 11 to dope oxygen therein since the flow of gallium monoxide in the carrier gas prevents the gallium trioxide from being dispersed from the melt 11.

Figure 8:
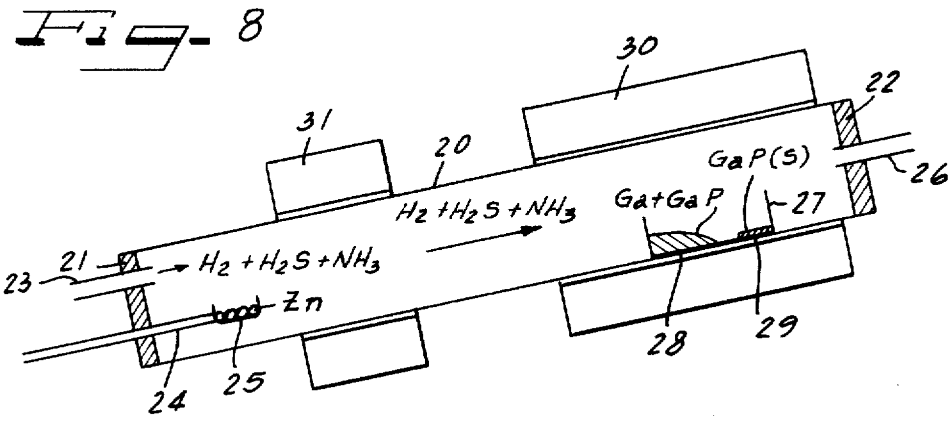
FIG. 8 diagrammatically illustrates a different form of the present invention as compared to FIG. 4.

Another preferred form of the present invention is to produce a novel luminescent diode by a novel method to produce a high efficiency unit for emitting green light. Such a diode and method is diagrammatically illustrated in FIG. 8 and FIG. 9. As shown, a tube of quartz is indicated generally by the reference numeral 20. At both ends of the tube 20 silicone rubber stoppers 21 and 22 are provided. The stopper 21 has a hole securing a gas inlet 23 and a hole for supporting a quartz pull rod 24 movably. The quartz pull rod 24 has a crucible 25 containing zinc particles at the end thereof. The other stopper 22 has a hole securing a gas outlet 26.

A boat 27 is provided within the tube 20. The boat 27 contains a melt 28 and a substrate 29. The melt 28 contains gallium and gallium phosphide, while the substrate 29 contains gallium phosphide with the donor impurity sulphur therein. The donor impurity sulphur may be replaced with tellurium but is preferable to obtain a higher luminescence efficiency in a green luminescent diode.

A pair of furnaces 30 and 31 are provided to heat the boat 27 and crucible 25, respectively, to the required temperatures. For instance, the furnace 30 may heat the boat 27 to approximately 1050° to 1200°C, while the furnace 31 may heat the crucible 25 to approximately 500° to 700°C.

When the boat 27 is heated at 1000°C, hydrogen sulfide $H_2S$ and ammonia $NH_3$ are introduced into the tube 20 through the gas inlet 23 together with a carrier gas, namely, hydrogen, and are reacted with the melt to diffuse sulphur and nitrogen thereinto.

Figure 9:
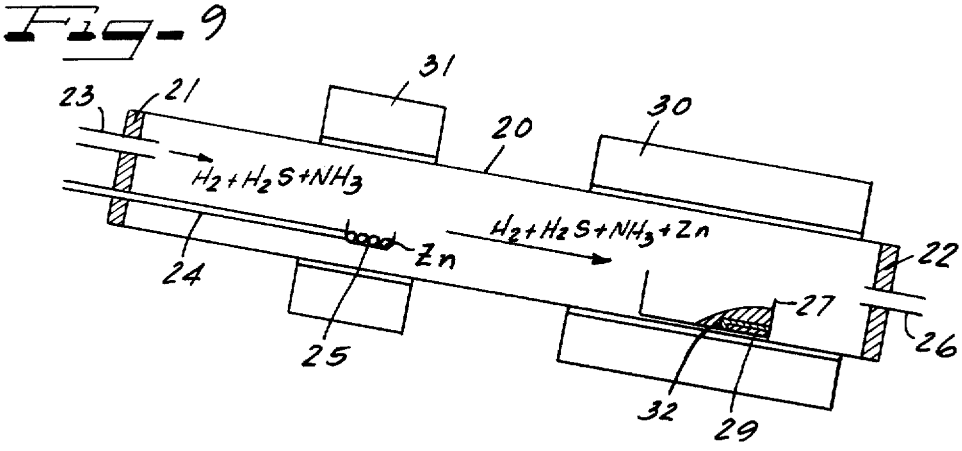
FIG. 9 is a diagrammatic view similar to FIG. 8 but showing the quartz tube tipped in the opposite direction from that shown in FIG. 8.

After 10 minutes diffusion of sulphur and nitrogen into the melt at 1100°C, the tube is inclined to the right as shown in FIG. 9 so that the melt overlies the substrate, and then a temperature of the furnace 30 is lowered gradually at a rate of 240°C/h to produce an epitaxial growth layer 32 containing nitrogen and sulphur therein.

During the above-described epitaxial growth process, the crucible 25 is introduced into the furnace 31 heated at 610°C by the pull rod 24 to vaporize zinc. The zinc vapor flows to the boat 27 in combination with hydrogen, hydrogen sulfide and ammonium so that zinc is diffused into the epitaxial growth layer 32 together with nitrogen and sulphur to form a pn junction therein. The diode produced by the above-described process has a high luminescence efficiency, such as 0.07% for green emitting light because the sufficient nitrogen is diffused in the vicinity of the pn junction.

Figure 10:
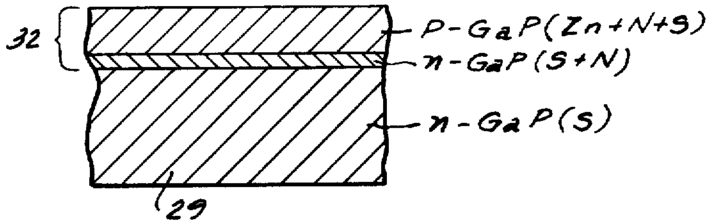
FIG. 10 is a fragmentary diagrammatic view illustrating the diode and its junction.

FIG. 10 shows a sectional view of the diode produced by the above-described process. The substrate of the preferred form has 300 micron thickness and the epitaxial layer 32 consists of an n-type region of 15 microns in thickness including sulphur and nitrogen, and a p-type region of 60 microns in thickness including zinc, nitrogen and sulphur. (The impurity concentration of sulphur is less than that of zinc.)

Hydrogen sulfide and ammonia can be replaced with lead sulfide and gallium nitride, respectively.

We claim as our invention:

1. A method of making a luminescent diode comprising the steps of providing a gallium phosphide substrate having an impurity donor of a first type therein and a melt of gallium-gallium phosphide solution, heating said substrate and said melt to the temperature range 1,050° to 1,200°C to render said melt a solution, passing a carrier gas of hydrogen containing hydrogen sulfide and ammonia over said melt and said substrate to cause the same to be reacted with said melt to diffuse sulfur and nitrogen thereinto and growing an epitaxial layer of gallium phosphide on said gallium phosphide substrate from said melt of gallium-gallium phosphide solution, and further including the step of producing zinc vapor over said substrate as said epitaxial layer is grown by heating zinc to a temperature range of 600°–620°C.

2. The method of claim 1 wherein said first type impurity donor is sulfur.

3. The method of claim 1 wherein said first type impurity donor is tellurium.

* * * * *